Patented Nov. 3, 1942

2,300,572

UNITED STATES PATENT OFFICE 2,300,572

PHTHALOCYANINE SULPHONIC ACID AMIDES

Hans Hoyer and Otto Bayer, Leverkusen-I. G. Werk, and Friedrich Nadler, Cologne-Mulheim, Germany, assignors to General Aniline & Film Corporation, a corporation of Delaware No Drawing. Application May 21, 1938, Serial No. 209,374. In Germany May 26, 1937

5 Claims. (Cl. 260—314)

The present invention relates to new dyestuffs of the phthalocyanine series.

Phthalocyanines represent a new class of dyestuffs which are employed either as pigments or in form of their sulphonic acids for the dyeing of textiles and also for the formation of pigments by converting the same into their insoluble color lakes by a treatment with lake-forming metal or amine salts, for instance calcium or barium salts. The phthalocyanines can be prepared in various ways, for instance by starting from aromatic o-dinitriles
o-dibromo compounds or
o-dicarboxylic acids and heating the same with metal salts, particularly with copper or copper salts. They usually contain metal in complex combination. Metal-free phthalocyanines can be prepared by removing from metal containing phthalocyanines those metals which are relatively loosely bound such as magnesium. Phthalocyanines which are derived from those aromatic compounds of the character described wherein the aromatic nucleus belongs to the benzene series are for convenience called in the following "phthalocyanines of the benzene series."

Our new compounds may be defined as phthalocyanines of the benzene series containing attached to the benzene nuclei at least one sulphonic acid amide group. This invention is based on the discovery that sulphonic acid amide groups, if substituted or unsubstituted, induce to the phthalocyanines valuable and remarkable new properties. Depending on the conditions employed for the preparation and on the choice of the starting materials the final products contain one, two, three, or four sulphonamide groups with or without other substituents. According to a preferred form of the invention these products contain sulphonic acid amide groups besides free sulphonic acid groups. Particular importance is attached to those products containing 2 to 3 sulphonic acid amide groups besides 2 to 1 free sulphonic acid radicals, it being understood that products containing a single sulphonamide group on the one hand and phthalocyanine tetrasulphamides on the other hand are also within the scope of our invention. Among the various types of phthalocyanines we prefer those containing copper in complex combination as these products are characterized by excellent fastness properties, particularly by an excellent fastness to light. Besides the copper containing compounds there are preferably employed those being free from metals in complex combination.

Depending on the nature of substituents which may be present in the sulphonic acid amide groups these new products can be employed for various applications. Thus, phthalocyanine sulphonamides having aliphatic or hydroaromatic radicals attached to the nitrogen are distinguished by an increased solubility in fats, oils and organic solvents such as alcohol, acetone, chloroform, benzene, pyridine, polystyrene, cellulose esters and the like; in consequence thereof, they are suitable for being employed as zapon lacquers and the like. This applies particularly to those phthalocyanine sulphonamides which have been prepared as more fully explained below by subsequently introducing the sulphonic acid amide groups into the ready made phthalocyanine. Products containing radicals of aromatic o-hydroxy-carboxylic acids can be employed for the preparation of chromium complex compounds, particularly on the fiber. Furthermore, the nitrogen of the sulphonamide groups may bear various other aromatic groups, either alone or in combination with aliphatic radicals. Moreover, phthalocyanine sulphonamides as far as they still contain (besides the sulphonamide groups) sulphonic acid groups, either free or in form of their amine salts, are capable of being converted into color lakes (for instance calcium or barium salts) which are characterized by excellent fastness properties and are distinguished from the color lakes of the corresponding pure sulphonic acids (i. e. those being free from sulphonamide groups) by their somewhat more reddish shade. Depending on the amount and the position of the sulphonamide and sulphonic acid groups part of our new products are capable of directly dyeing cellulosic materials such as cotton or viscose and cuprammonium silk. This applies particularly to those phthalocyanine sulphonamide sulphonic acids which are obtainable by causing ammonia to react with phthalocyanine sulphonic acid chlorides. Thus, phthalocyanine disulphonic acid disulphamides and phthalocyanine trisulphamide monosulphonic acids represent excellent substantive dyestuffs.

Our new phthalocyanines can be prepared in various ways. In accordance with one method of working we start from such benzene derivatives being capable of being converted into phthalocyanines as contain free or substituted sulphonamide groups preferably in 4-position with respect to the phthalocyanine forming substituents, and subject the same to a suitable method for effecting ring closure to the phthalocyanine. Of the methods enumerated above we prefer the so-called "phthalic acid anhydride urea process," i. e. we start from phthalic acid anhydride-4-sulphone amides and heat the same with a copper salt in the presence of urea. Products which contain sulphon-amide groups besides free sulphonic acid groups are obtainable according to the said process by starting from phthalic acid-4- sulphonic acid chloride, the sulphonic acid chloride groups being partly converted into sulphonamide groups and partly into sulphonic acid groups in the course of the reaction. According to another method of working we start from such phthalocyanine sulphonic acid chlorides as can be prepared according to the process of U. S. P. No. 2,219,330 to Nadler et al. issued October 29, 1940, and cause the same to react with ammonia or aliphatic, araliphatic, hydroaromatic or aromatic primary or secondary amines. It is assumed that in these products the sulphonic acid amide groups are at least partly attached to the benzene nucleus in 3-position with respect to the substituents which belong to the phthalocyanine nucleus.

It is to be understood that our new products may contain (besides the sulphonamide and the sulphonic acid groups) various other substituents without departing from the scope of our invention. Thus, they may contain phenyl radicals, such phenyl substituted products being obtainable for instance by converting into phthalocyanines 3,4-dicyandiphenyl alone or in admixture with phthalodinitrile as is more fully described in application Serial No. 106,829 to Bienert and Gassner now U. S. P. No. 2,213,517 issued September 3, 1940.

The following examples illustrate the present invention without, however, restricting it thereto the parts being by weight:

Example 1

39.1 parts of 1,2-dibromobenzene-4-sulphophenylamide are heated to boiling with 180 parts of cuprous cyanide in 150 parts of quinoline for 5 hours. After cooling and adding caustic soda lye to the reaction mixture, the quinoline is blown off and the remaining bluish-green solution of the phthalocyanine tetraphenylsulphonamide is freed by filtration from copper. On the addition of acid the dyestuff is separated in the form of bluish flakes. After filtration with suction and drying it forms a blue-bronze crystalline powder which is easily soluble in aqueous alkalies. It is assumed that the resulting product represents a phthalocyanine tetrasulphanilide.

Example 2

100 parts of phthalic acid-4-sulphonamide in 300 parts of urea are heated to 150° C. with the addition of 25 parts of cuprous chloride, 2 parts of boric acid and 2 parts of ammonium molybdate, whereupon the temperature is gradually raised to 180-190° C. When the formation of the dyestuff is complete, the melt is dissolved in hot dilute caustic soda lye, filtered from the copper still present therein, and the sodium salt is salted out by means of sodium chloride. On drying it forms a bronze-blue lake which is easily soluble in water. On precipitating the dyestuff by means of barium chloride there is obtained a brilliant lake dyestuff suitable for graphic prints. The resulting product probably represents a phthalocyanine tetrasulphamide.

Example 3

To a mixture of 100 parts of phthalic acid-4-phenylsulphonamide (colorless leaflets of melting point 193-194° C. with foaming) and 300 parts of urea there are added at 150° C. 25 parts of copper chloride, 2 parts of boric acid and 2 parts of ammonium molybdate, whereupon the reaction mixture is heated to 180-190° C. and kept at this temperature until the formation of the dyestuff is complete. Thereupon the melt is dissolved in hot dilute caustic soda lye, freed from excess copper and acidified, the dyestuff thus precipitating in the form of bluish-green flakes. On drying it forms a bronze-blue lake which is easily soluble in dilute caustic soda lye with a bluish-green coloration. It is also easily soluble in pyridine and other organic solvents. The product thus obtained probably represents a phthalocyanine tetrasulphanilide.

Example 4

100 parts of phthalic acid-4-methyl phenyl sulphonamide (which is obtained by condensing phthalic acid sulphochloride with monomethylaniline) and 300 parts of urea are heated to 150° C. To this melt there are added 25 parts of cuprous chloride, 2 parts of boric acid and 2 parts of ammonium molybdate, heating being continued to 200-210° C. until the formation of the dyestuff is complete. Thereupon the melt is boiled with dilute hydrochloric acid, filtered with suction, washed neutral and dried. The dyestuff thus obtained forms a bluish-green powder which is insoluble in alkalies. It is assumed that the product thus obtained probably represents a phthalocyanine tetrasulphamide.

Example 5

An intimate mixture of

| | Parts |
|---|---|
| Phthalic acid butylsulphamide | 10 |
| Urea | 30 |
| Copper chloride | 2 |
| and | |
| Ammonium molybdate | 0.1 | is heated to 180° until the formation of the dyestuff is complete. Thereupon the melt is diluted with dilute hydrochloric acid, heated to boiling and sucked off. The dyestuff thus obtained represents a greenish-blue powder which is soluble in dilute sodium lye, pyridine, dioxane and acetone. It probably represents a phthalocyanine tetrasulphamide.

Example 6

An intimate mixture of

| | Parts |
|---|---|
| Phthalic acid isobutylsulphamide | 10 |
| Urea | 30 |
| Copper chloride | 2 |
| and | |
| Ammonium molybdate | 0.1 | is melted at about 180° until the formation of the phthalocyanine is complete. Thereupon the melt is boiled with dilute hydrochloric acid, sucked off and dried. The dyestuff thus obtained represents a greenish-blue powder which is soluble in dilute sodium lye, pyridine, dioxane and acetone. The resulting product probably represents a phthalocyanine tetrasulphamide.

Example 7

100 parts of phthalic acid-4-sulphochloride in 300 parts of urea are gradually heated to 150° C. with the addition of 25 parts of cuprous chloride, 2 parts of boric acid and 2 parts of ammonium molybdate, whereupon the temperature is raised to 180-190° C. On working up the melt as described in Example 1 the dyestuff is obtained in the form of water soluble bronze-blue crystals. The resulting product probably contains sulphamide groups besides sulphonic acid groups and yields on neutralization with lake forming metals such as barium or calcium valuable color lakes which show a brilliant blue shade.

*Example 8*

10 parts of copper phthalocyanine sulphochloride (obtainable by causing chlorosulphonic acid to react at an elevated temperature upon copper phthalocyanine) are stirred at room temperature with 25 parts of monoisohexylamine, a raise of temperature to 40° C. being effected thereby. Stirring is continued for several hours at room temperature, whereupon the reaction product is diluted with 100 parts of water and then with hydrochloric acid. The dyestuff thus precipated is filtered with suction, rinsed with water and dissolved in 300 parts of alcohol. On purifying with animal charcoal and evaporating the solvent there is obtained in a nearly quantitative yield a blue dyestuff which is easily soluble in alcohol, chloroform, acetone and chlorobenzene. The resulting product probably contains 2 to 3 isohexyl sulphonic acid amide groups, the other sulphonic acid groups being present in form of isohexylamine salts.

*Example 9*

To 5 parts of finely powdered copper phthalocyanine sulphochloride (obtained as described in Example 8) there are added while stirring at 60° 20 parts of dodecylamine, whereupon the dyestuff dissolves. On heating for about 1 hour to 60° C. the excess dodecylamine is evaporated with steam. Thereupon the residue is dissolved in benzene, boiled with animal charcoal, filtered with suction and the solvent is evaporated with steam. The dyestuff thus obtained represents a blue powder which is easily soluble in benzene, trichlorobenzene, pyridine and quinoline. It is assumed that the resulting product corresponds in structure to the product of Example 8.

*Example 10*

10 parts of copper phthalocyanine sulphochloride (obtained as described above) are added into an excess of a molecular mixture of butylamine, butanolamine, monoisohexylamine and hexahydroaniline and heated for 12 hours at room temperature. On working up in the usual way there is obtained a blue powder which is easily soluble in alcohol and acetone. It is assumed that the resulting product corresponds in structure to the product of Example 8.

*Example 11*

Tetraphenyl copper phthalocyanine sulphochloride (obtainable by causing chlorosulphonic acid to react at an elevated temperature upon tetraphenyl copper phthalocyanine—see U. S. P. No. 2,213,517 to Bienert and Gassner) is stirred into excess hexahydroaniline, the sulphochloride being dissolved thereby. Stirring is continued for several hours at room temperature until the reaction is complete. On working up the reaction product as described above a green powder is obtained which is easily soluble in alcohol, acetone and pyridine. It is assumed that the resulting product corresponds in structure to the product of Example 8.

*Example 12*

A moist paste of the diphenyl copper phthalocyanine sulphochloride (obtainable by causing chlorosulphonic acid to react at an elevated temperature upon diphenyl copper phthalocyanine— see Example 18 of U. S. P. No. 2,213,517 to Bienert and Gassner) is added to excess butylamine and the whole is stirred for about 12 hours at about 20° C. Thereupon the reaction mixture is diluted by means of ice water and dilute hydrochloric acid while cooling until the dyestuff precipitates. On filtering, rinsing with dilute hydrochloric acid and then with a dilute caustic soda solution the dyestuff is dissolved in alcohol, heated to boiling with animal charcoal and filtered. On evaporating the solvent the dyestuff is obtained in form of a green powder which is soluble in acetone and alcohol with a clear greenish-blue coloration.

*Example 13*

Copper phthalocyanine sulphochloride (obtainable as described in Example 8) in form of a moist paste is added to an excess of a saturated ammonia solution. After stirring for several hours at room temperature the excess ammonia is distilled off. The solution thus obtained is diluted with water and then poured into a 10% hydrochloric acid solution while stirring. The precipitating product is filtered off and dried: it represents a dark-blue powder which is easily soluble in a dilute sodium carbonate solution with a clear blue coloration. It represents a mixture of several phthalocyanine sulphamides the chief constituents of which are disulphamide disulphonic acids and trisulphamide monosulphonic acids.

*Example 14*

To a suspension of aniline in water there is added copper phthalocyanine sulphochloride (obtainable as described in Example 8) and while stirring at room temperature a 10% sodium carbonate solution until the reaction is alkaline. Stirring is continued for 20 hours at 20–25° whereupon the solution is acidified by means of hydrochloric acid. The dyestuff thus obtained represents a blue powder which is insoluble in sodium carbonate; it dissolves, however, in an aqueous caustic soda lye with a blue coloration. It probably represents a phthalocyanine disulphanilide disulphonic acid and/or a trisulphamide monosulphonic acid.

*Example 15*

97 parts of copper phthalocyanine tetrasulphochloride (obtainable as described in Example 8), 61.2 parts of 5-amino-2-hydroxybenzoic acid and 55 parts of crystallized sodium acetate are stirred for several hours at room temperature with about 500 parts of acetone. When the reaction is complete the solvent is distilled off, whereupon the residue is dissolved in water, salted out, filtered and dried. A blue powder is thus obtained which is easily soluble in water. This product contains at least one radical of the amino salicylic acid connected with a sulphonic acid group, whereas the remaining sulphochloride groups have been saponified to sulphonic acid groups in the course of the reaction. This product is capable of being converted on the fiber into a chromium complex compound. The dyeings thus produced are characterized by an excellent fastness to washing.

*Example 16*

A copper phthalocyanine sulphonic acid chloride obtainable by converting phthalic acid-4-sulphonic acid into the copper phthalocyanine tetrasulphonic acid and subsequently causing this product to react with chlorosulfonic acid, is stirred into excess butyl amine. Dissolution occurs slowly heat being evolved thereby. After several hours' stirring the excess butyl amine is evaporated by means of steam. For purification the residue is dissolved in acetone and freed from undissolved impurities by filtration, the solvent being subsequently evaporated. A new dyestuff is obtained in a nearly quantitative yield in form of a blue powder which is easily soluble in alcohol, acetone and pyridine. It is assumed that the dyestuff contains two sulphonic acid butyl amide groups and two sulphonic acid groups as butyl amine salts or three sulphonic acid amide groups and one sulphonic acid group. The sulphonic acid amide and the sulphonic acid groups are probably attached to the benzene nuclei in 4-position.

*Example 17*

10 parts of a copper phthalocyanine sulphonic acid chloride obtainable as described in Example 16 are added into 100 parts of a concentrated ammonia solution and stirred for several hours at room temperature until dissolution has occurred. Thereupon the excess ammonia is evaporated and the reaction product is stirred into 100 parts of a 10% hydrogen chloride solution. The dyestuff is precipitated thereby. After drying it represents a blue powder which is insoluble in a sodium carbonate solution. It is supposed that the product corresponds in structure to the product of Example 16, the butyl amide groups being replaced by non-substituted amide groups.

*Example 18*

2 parts of a metal-free phthalocyanine sulphonic acid chloride (obtainable by causing chlorosulphonic acid to react with a metal-free phthalocyanine) are added into a mixture of 10 parts of aniline, 50 parts of water and about 0.4 part of sodium carbonate, the reaction mixture being thoroughly stirred for several hours. The reaction mixture is acidified by means of hydrogen chloride, the precipitating dyestuff is filtered off and washed by means of alcohol. It represents a green powder soluble in nitrobenzene and pyridine and sparingly soluble in alcohol, chlorobenzene, acetone, dioxane and insoluble in gasoline and ether. It is easily soluble in an aqueous alcoholic solution upon the addition of some caustic soda or ammonia. The dyestuff is capable of being vatted in the usual manner and is reoxidized by exposure to air. The reaction product mostly represents a trisulphonic acid anilide monosulphonic acid.

*Example 19*

The metal-free phthalocyanine sulphonic acid chloride (obtained as described in the preceding example) is stirred into excess ammonia solution the whole being stirred for several hours at room temperature. The resulting dyestuff is salted out by means of a saturated sodium chloride solution and after filtration redissolved in hot water and salted out by means of a 3% sodium chloride solution. In the dry state the dyestuff represents a greenish-blue powder easily soluble in water. It probably contains sulphonic acid amide groups besides free sulphonic acid groups in form of their ammonium salts.

*Example 20*

A cobalt phthalocyanine sulphonic acid chloride is stirred with excess butyl amine for several hours at room temperature. As soon as dissolution has occurred the reaction mixture is diluted with some water and acidified by means of hydrogen chloride until a weak congo acid reaction is reached. The precipitating dyestuff is filtered off; for purification it can be dissolved in alcohol, boiled with active carbon and then isolated by evaporating the solvent. It represents a bluish-green powder which is soluble in alcohol, acetone and pyridine and insoluble in water and gasoline. The structure of the new product probably corresponds to that of Example 8, copper being replaced by cobalt.

*Example 21*

13 parts of a dry copper phthalocyanine sulphonic acid chloride are added into 45 parts of monomethyl aniline. Dissolution occurs heat being evolved thereby. The reaction mixture is heated for 5 hours to 60°. After cooling and diluting the reaction mixture with water it is acidified by means of hydrogen chloride, the precipitating dyestuff is isolated and washed with alcohol. It represents a blue powder which is capable of being vatted in the usual manner. It is insoluble in water, even in the presence of caustic soda. It probably contains three sulphonic acid groups in form of their methyl anilides and one free sulphonic acid group.

*Example 22*

A copper phthalocyanine sulphonic acid chloride (obtainable from 10 parts of copper phthalocyanine and 180 parts of chlorosulphonic acid at 130–135° with the addition of 20 parts of phosphorus pentachloride (as described in Example 7 of U. S. P. No. 2,219,330 to Nadler issued October 29, 1940) is dissolved in 200 parts of nitrobenzene. 100 parts of aniline are slowly added thereto care being taken that the temperature does not exceed 60°. The reaction product is stirred for several hours; thereupon the nitrobenzene and the excess aniline are evaporated by means of steam. There are obtained 17 parts of a blue powder which probably represents a copper phthalocyanine tetrasulphonic acid anilide. It is insoluble in water, alcohol, acetone and benzene and easily soluble in pyridine, furthermore in caustic soda in the presence of alcohol.

We claim:

1. Phthalocyanines of the benzene series containing attached to the benzene nuclei up to four sulphonic acid amide groups.

2. Phthalocyanines of the benzene series containing attached to the benzene nuclei sulphonic acid amide groups besides free sulphonic acid groups.

3. Phthalocyanines as claimed in claim 2 wherein the number of the sulphonic acid amide groups plus the number of the sulphonic acid groups is at the most 4.

4. Phthalocyanines of the benzene series containing attached to the benzene nuclei sulphonic acid amide groups besides free sulphonic acid groups in form of salts with a base selected from the group consisting of ammonia and aliphatic amines.

5. Phthalocyanines as claimed in claim 4 wherein the number of the sulphonic acid amide groups plus the number of the sulphonic acid groups is at the most 4.

HANS HOYER.
OTTO BAYER.
FRIEDRICH NADLER.